(12) United States Patent
Kim et al.

(10) Patent No.: US 7,619,858 B2
(45) Date of Patent: Nov. 17, 2009

(54) HEAD STACK ASSEMBLY, HARD DISK DRIVE HAVING THE SAME, AND HARD DISK DRIVE METHOD INCLUDING CENTER OF GRAVITY COMPENSATION

(75) Inventors: Youn-Tai Kim, Yongin-si (KR); Sung-Wook Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 369 days.

(21) Appl. No.: 11/409,054

(22) Filed: Apr. 24, 2006

(65) Prior Publication Data

US 2007/0014052 A1    Jan. 18, 2007

(30) Foreign Application Priority Data

Jul. 12, 2005    (KR) .................... 10-2005-0062611

(51) Int. Cl.
*G11B 5/48* (2006.01)

(52) U.S. Cl. ................................. 360/265.7; 360/265.9

(58) Field of Classification Search ............. 360/265.2, 360/265.7, 265.9

See application file for complete search history.

(56) References Cited

U.S. PATENT DOCUMENTS

| | | | | |
|---|---|---|---|---|
| 6,310,749 | B1 * | 10/2001 | Beatty et al. ............. | 360/265.7 |
| 6,532,137 | B2 * | 3/2003 | Huang et al. ............. | 360/265.7 |
| 7,016,157 | B1 * | 3/2006 | Williams et al. ......... | 360/265.7 |
| 7,046,484 | B2 * | 5/2006 | Honda et al. ............. | 360/266.1 |
| 7,161,769 | B1 * | 1/2007 | Chang et al. ............. | 360/265.9 |
| 2002/0063999 | A1 * | 5/2002 | Huang et al. ............. | 360/265.7 |
| 2002/0141114 | A1 | 10/2002 | Wittig et al. | |
| 2003/0043510 | A1 * | 3/2003 | Miyamoto et al. ........ | 360/254.7 |
| 2003/0086212 | A1 * | 5/2003 | Tsuda ..................... | 360/265.7 |
| 2003/0128477 | A1 * | 7/2003 | Macpherson et al. ..... | 360/265.7 |
| 2004/0090710 | A1 * | 5/2004 | Honda et al. ............. | 360/244.8 |
| 2005/0018358 | A1 * | 1/2005 | Kuwajima et al. ....... | 360/265.7 |
| 2005/0128644 | A1 * | 6/2005 | Wada et al. .............. | 360/244.2 |
| 2006/0256477 | A1 * | 11/2006 | Yang et al. ............... | 360/244.2 |

FOREIGN PATENT DOCUMENTS

| | | |
|---|---|---|
| JP | 63-076160 | 4/1988 |
| JP | 10-106181 | 4/1998 |
| JP | 2001-035099 | 2/2001 |

(Continued)

OTHER PUBLICATIONS

Korean Office Action dated Aug. 30, 2006, and issued in corresponding Korean Patent Application No. 10-2005-0062611.

*Primary Examiner*—Jefferson Evans
(74) *Attorney, Agent, or Firm*—Staas & Halsey LLP

(57) ABSTRACT

A head stack assembly includes a head stack assembly main body moving a head across a disk, and rotating around a predetermined pivot shaft. The head stack assembly also includes a center of gravity compensation portion coupled to the head stack assembly main body and compensating for imbalances in the center of gravity of the head stack assembly main body to be not more than a reference imbalance value. The reference imbalance value is based on an imbalance value of the center of gravity of the head stack assembly main body measured with respect to a rotational center of the pivot shaft.

10 Claims, 8 Drawing Sheets

FOREIGN PATENT DOCUMENTS

| | | |
|---|---|---|
| JP | 2003-151223 | 5/2003 |
| JP | 2003-228935 | 8/2003 |
| KR | 1998-63201 | 1/1998 |
| KR | 1998-84524 | 12/1998 |
| KR | 10-2001-0051238 | 6/2001 |
| KR | 2002-42423 | 6/2002 |

* cited by examiner

HEAD STACK ASSEMBLY, HARD DISK DRIVE HAVING THE SAME, AND HARD DISK DRIVE METHOD INCLUDING CENTER OF GRAVITY COMPENSATION

CROSS-REFERENCE TO RELATED APPLICATIONS

This application claims the benefit of Korean Application No. 10-2005-0062611, filed Jul. 12, 2005, in the Korean Intellectual Property Office, the disclosure of which is incorporated herein by reference.

BACKGROUND OF THE INVENTION

1. Field of the Invention

Embodiments of the present invention relate to head stack assemblies, hard disk drives having the same, and hard disk drive methods, and more particularly, to a head stack assembly which can compensate for an imbalance in the center of gravity of the head stack assembly when an imbalance value of the center of gravity, measured with respect to the rotational center of a pivot shaft, does not satisfy predetermined requisites. The imbalance in the center of gravity can be compensated by making the imbalance value not more than a reference value that satisfies the requisites.

2. Description of the Related Art

Hard disk drives are one of may types of memory devices that include electronic units and mechanical units for respectively converting a digital electronic pulse into/from a permanent magnetic field on a disk to record and reproduce data. As an example, hard disk drives have been widely used as auxiliary memory devices for computer systems because they can access a large amount of data at a high speed. In addition, compact hard disk drives having a diameter of 0.85 inches, similar to the size of a coin, have been recently developed for mobile phones. It is expected that hard disk drive application areas will continue to increase in the future.

As an example, the hard disk drive includes a disk for storing data, a spindle motor for rotating the disk, a head stack assembly (HSA) for recording and/or reading data to/from the disk while moving across the disk around a predetermined pivot shaft, a printed circuit board assembly (PCBA) for controlling the above-described parts, and a base for supporting these constituent parts.

FIG. 1 illustrates a conventional head stack assembly of a hard disk drive. Referring to FIG. 1, a head stack assembly 110 includes a magnetic head 112 for the recording and/or reproducing of data to/from the disk, an actuator arm 113, pivoting around a pivot shaft 116, to move across the disk so that the magnetic head 112 can access data on different portions of the disk, a pivot shaft holder 115 for rotatably supporting the pivot shaft 116, and a bobbin 117, extending from the pivot shaft holder 115 in an opposite direction as the actuator arm 113, and having VCM coil 118 wound therearound between magnets (not shown) of a voice coil motor (VCM, not shown). The actuator arm 113 may include a swing arm 113a, rotating around the pivot shaft 116 by the operation of the voice coil motor, and a suspension 113b having an end portion where the magnetic head 112 is attached.

The voice coil motor may be a sort of a drive motor for pivoting the actuator arm 113 to move the magnetic head 112 over a desired position on the disk, according to the Fleming's left hand rule, that is, the force generated when current is applied to a conductive body located in a magnetic field. As current is applied to the VCM coil 118, located between the magnets, a force is generated and applied to the bobbin 117 to pivot the same. Thus, as the actuator arm 113, extending from the pivot shaft holder 115 in an opposite direction as the bobbin 117, pivots, the magnetic head 112 supported at the end portion of the actuator arm 113 moves across a rotating disk to search tracks and access desired information.

One of the items to consider when the head stack assembly 110 is designed and manufactured is to match the centers of gravity of the head stack assembly 110 and the pivot shaft 116. To match the centers of gravity of the head stack assembly 110 and the pivot shaft 116 is important to enhance a position determination accuracy of the magnetic head 112. This becomes even more important because the capacities of a hard disk drives have been rapidly increasing with the recent implementation of high track per inch (TPI) requirements, as well as because hard disk drives are becoming widely used for apparatuses other than personal computers.

When the imbalance value of the center of gravity of the head stack assembly 110, with respect to the rotational center of the pivot shaft 116, does not satisfy predetermined requisites, a position error signal (PES) during the seek of the magnetic head 112 becomes affected upon generation of vibrations. Consequently, throughput efficiency in reading/writing from/to a hard disk drive is lowered. Thus, there is a need to minimize imbalances in the front/back and left/right directions of the center of gravity of the head stack assembly 110 to within in a controllable range.

Designing of a head stack assembly 110 may be performed through simulations to maintain an acceptable imbalance of the head stack assembly 110. As an example, Korean Patent Publication No. 2002-042423 discusses the attachment of a dummy weight to compensate for imbalances for a dipop version of a hard disk drive. Similarly, Korean Patent Publication No. 1998-084524 discusses the attachment of a dummy weight to compensate for imbalance due to the attachment/detachment of a detachable swing arm.

However, even when the imbalance value is designed to be close to "0" in actual implementations, including the above referenced conventional systems, when the center of gravity of an actual manufactured head stack assembly is measured using a balance measurer, the imbalance value of the center of gravity of the head stack assembly 110 is different from a designed value, in particular, the imbalance value frequently does not match the predetermined requisites. This difference is typically due to differing tolerances in respective parts or processes. Since the actually manufactured head stack assembly 110 frequently has an imbalance value different form the designed value, there is a limit to the compensating of the imbalance in the center of gravity before measuring the center of gravity of the actually manufactured head stack assembly 110. Thus, a variety of methods to reduce process tolerances during the manufacture of the head stack assembly 110 have been used. Nevertheless, when the center of gravity of the actually manufactured head stack assembly 110 is measured using the balance measurer, the imbalance value frequently exceeds the reference imbalance value. Further, when a vibration test is performed with respect to the actually manufactured head stack assembly 110, the throughput, having a strong correlation with the imbalance value, does not satisfy the predetermined requisites.

As described above, according to conventional operations, even when the head stack assembly is designed to have an imbalance value close to "0", the imbalance value of the center of gravity of the actually manufactured head stack assembly exceeds the required reference imbalance value. Thus, in the hard disk drive having such a head stack assembly, the position error signal is frequently affected by vibrations, thereby remarkably lowering throughput efficiency of the hard disk.

SUMMARY OF THE INVENTION

To achieve the above and/or other aspects and advantages, embodiments of the present invention include a head stack assembly, including a head stack assembly main body for moving across a disk, around a predetermined pivot shaft, for recording and/or reproducing of data to/from the disk, and a center of gravity compensation portion included with the head stack assembly main body and compensating for an imbalance in a center of gravity, with respect to a rotational center corresponding to the pivot shaft, of the head stack assembly main body to correspond to not being more than a reference imbalance value based on a measured imbalance in a center of gravity, with respect to a pivot shaft rotational center, of the head stack assembly main body.

Further, the reference imbalance value may be between 1-30 mg·cm.

The head stack assembly main body may include an actuator arm, a pivot shaft holder rotatably supporting the pivot shaft, where the actuator arm is coupled and supported, and a bobbin extending from the pivot shaft holder in a direction opposite to the actuator arm, wherein the center of gravity of the head stack assembly main body is set to fall along a side of the bobbin on a plane passing through the pivot shaft and perpendicular to a lengthwise direction of the actuator arm, with the center of gravity compensation portion being provided with at least one of the actuator arm and the pivot shaft holder.

Here, the actuator arm may have a triangular penetration opening formed in a center area thereof to substantially have a triangular shape. In addition, the center of gravity compensation portion may be a compensation weight coupled to the actuator arm.

The center of gravity compensation portion may be a compensation weight coupled to the head stack assembly main body. The compensation weight may further be a compensation weight plate that contacts a surface of the head stack assembly main body adjacent to a triangular penetration opening of head stack assembly main body and is supported by the head stack assembly main body.

The compensation weight may be one of a screw and a balance snap which are detachably coupled to an area on a surface of the head stack assembly main body.

In addition, the compensation weight may be a fluid material when initially contacting an area of a surface of the head stack assembly main body. The fluid material may further be one of glue and bonding material.

The compensation weight may be a balance ring that is partially inserted along an inner surface of a triangular penetration opening of the head stack assembly main body. In addition, the balance ring may be substantially has a "U" shape with two legs, and the two legs having different lengths.

To achieve the above and/or other aspects and advantages, embodiments of the present invention include a hard disk drive, including at least one rotatable disk for storing data, and a head stack assembly included a head stack assembly main body for moving across the disk, around a predetermined pivot shaft, and a center of gravity compensation portion included with the head stack assembly main body and compensating for an imbalance in a center of gravity, with respect to a rotational center corresponding to the pivot shaft, of the head stack assembly main body to correspond to not being more than a reference imbalance value based on a measured imbalance in a center of gravity, with respect to a pivot shaft rotational center, of the head stack assembly main body.

Here, the reference imbalance value may further be between 1-30 mg·cm.

The head stack assembly main body may include an actuator arm, pivot shaft holder rotatably supporting the pivot shaft, where the actuator arm is coupled and supported, and a bobbin extending from the pivot shaft holder in a direction opposite to the actuator arm, wherein the center of gravity of the head stack assembly main body is set to fall along a side of the bobbin on a plane passing through the pivot shaft and perpendicular to a lengthwise direction of the actuator arm, with the center of gravity compensation portion being provided with at least one of the actuator arm and the pivot shaft holder.

The actuator arm may have a triangular penetration opening formed in a center area thereof to substantially have a triangular shape. Further, the center of gravity compensation portion may be a compensation weight that is coupled to the actuator arm.

The compensation weight may be a compensation weight plate that contacts a surface of the head stack assembly main body adjacent to a triangular penetration opening of the head stack assembly main body and is supported by the head stack assembly main body.

In addition, the compensation weight is one of a screw and a balance snap which are detachably coupled to an area on a surface of the head stack assembly main body.

The compensation weight may be fluid material when initially contacting an area of a surface of the head stack assembly main body. In addition, the fluid material may be one of glue and bonding material.

The compensation weight may be a balance ring that is partially inserted along an inner surface of a triangular penetration opening of the head stack assembly main body. Here, the balance ring may substantially have a "U" shape with two legs, the two legs having different lengths.

To achieve the above and/or other aspects and advantages, embodiments of the present invention include a hard disk drive method, including measuring an imbalance value of a center of gravity of a head stack assembly main body with respect to a rotational center corresponding to a pivot shaft, and compensating for an imbalance in the measured center of gravity to not be more than a reference imbalance value by instilling a center of gravity compensation portion with the head stack assembly main body.

The method may further include installing the head stack assembly main body into a hard disk drive body for moving across a disk around a pivot shaft, The center of gravity compensation portion may be instilled with the head stack assembly main body based on a measured imbalance in a center of gravity, with respect to a pivot shaft rotational center, of the head stack assembly main body.

The method may further include modifying the center of gravity compensation portion to compensate for another measured imbalance in a center of gravity, with respect to a pivot shaft rotational center, of the head stack assembly main body.

Further, in the compensating of the imbalance in the center of gravity, the reference imbalance value is between 1-30 mg·cm.

In the hard disk drive method, the head stack assembly main body may include an actuator arm, a pivot shaft holder rotatably supporting the pivot shaft, where the actuator arm is coupled and supported, and a bobbin extending from the pivot shaft holder in a direction opposite to the actuator arm, wherein, the center of gravity of the head stack assembly main body is set to fall along a side of the bobbin on a plane passing through the pivot shaft and perpendicular to a lengthwise direction of the actuator arm, with the compensating of the imbalance includes instilling the center of gravity compensation portion with at least one of the actuator arm and the pivot shaft holder.

The center of gravity compensation portion is a compensation weight that is coupled to the actuator arm. In addition, the center of gravity compensation portion may be a compensation weight that is coupled to the head stack assembly main body.

The compensation weight may be a compensation weight plate that contacts a surface of the head stack assembly main body adjacent to a triangular penetration opening of the head stack assembly main body and is supported by the head stack assembly main body.

To achieve the above and/or other aspects and advantages, embodiments of the present invention include a hard disk drive method, including installing a head stack assembly main body into a hard disk drive body for moving across a disk around a pivot shaft, and compensating for an imbalance in a center of gravity of the head stack assembly main body, with respect to a rotational center corresponding to the pivot shaft, to not be more than a reference imbalance value, by instilling a center of gravity compensation portion with the head stack assembly main body.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
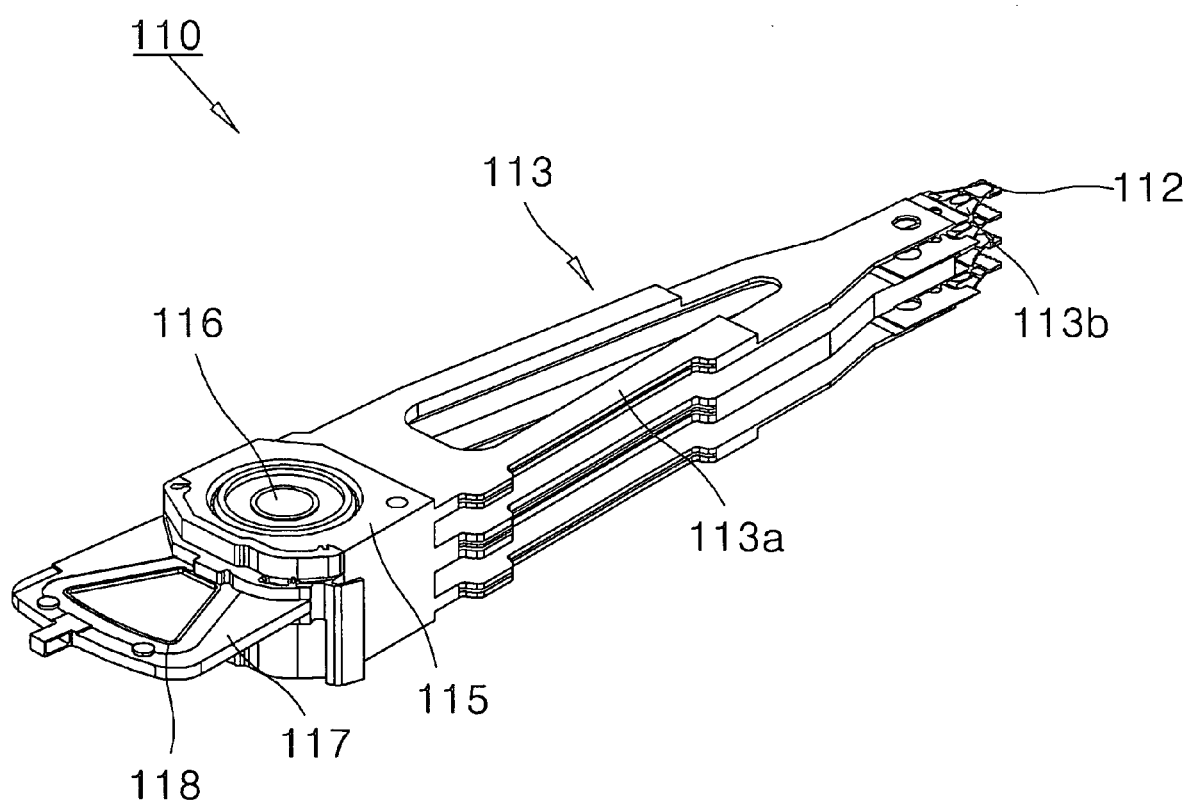
FIG. 1 illustrates a conventional head stack assembly of a hard disk drive.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
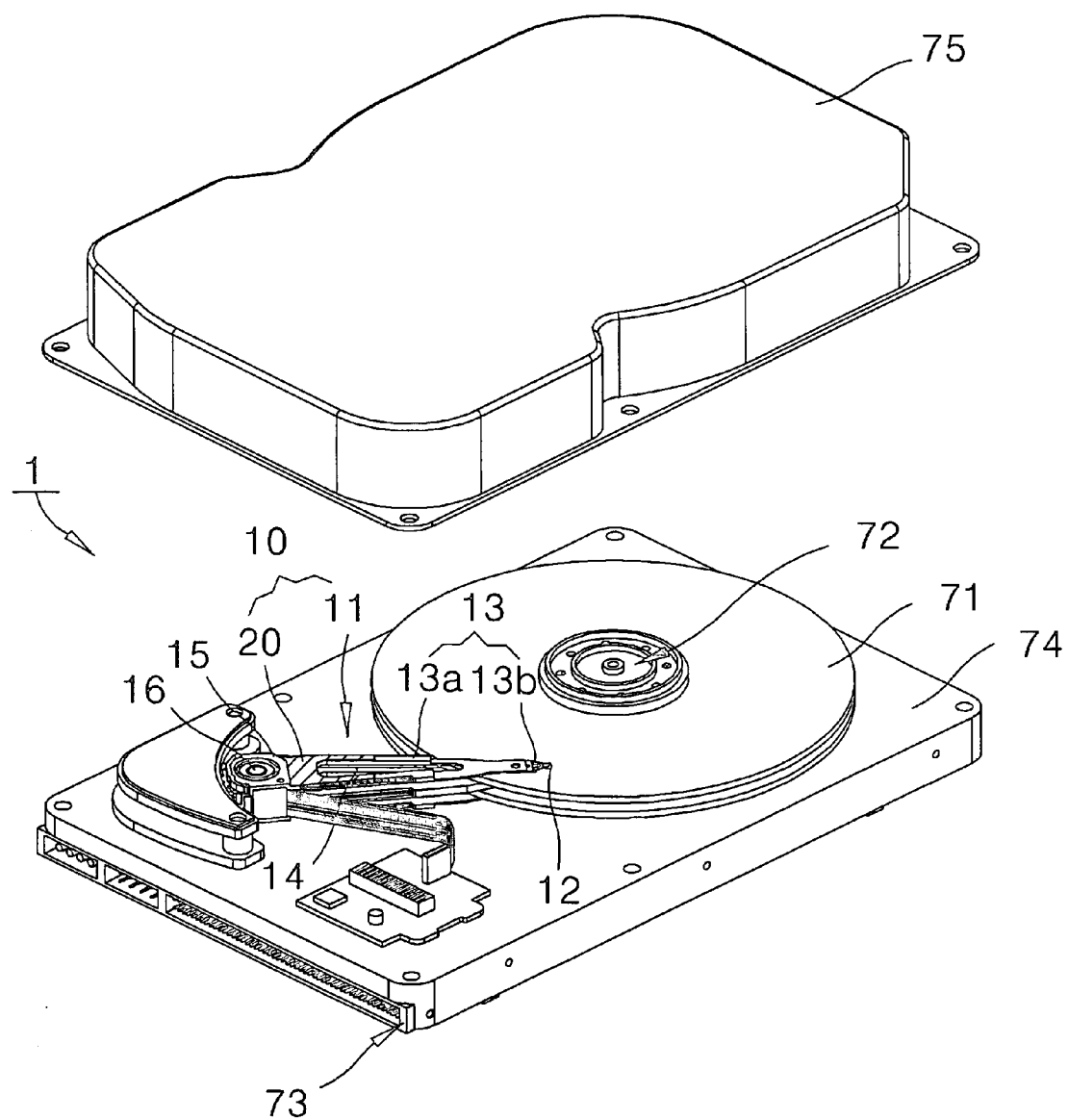
FIG. 2 illustrates an exploded perspective view of a hard disk drive, according to an embodiment of the present invention.

FIG. 2 illustrates a hard disk drive according to an embodiment of the present invention. Referring to FIG. 2, a hard disk drive 1 may include a disk 71 for storing data, a spindle motor 72 for rotating the disk 71, a head stack assembly (HSA) 10, pivoting around a pivot shaft 16, to move across the disk 71 so that a magnetic head 12 can record and/or reproduce data to/from the disk 71, a printed circuit board assembly (PCBA) 73, which includes a printed circuit board (PCB) on which most circuit parts may be installed, for controlling the above-described parts, a base 74 on which any of the above parts are assembled, and a cover 75 to cover the base 74.

Figure 3:
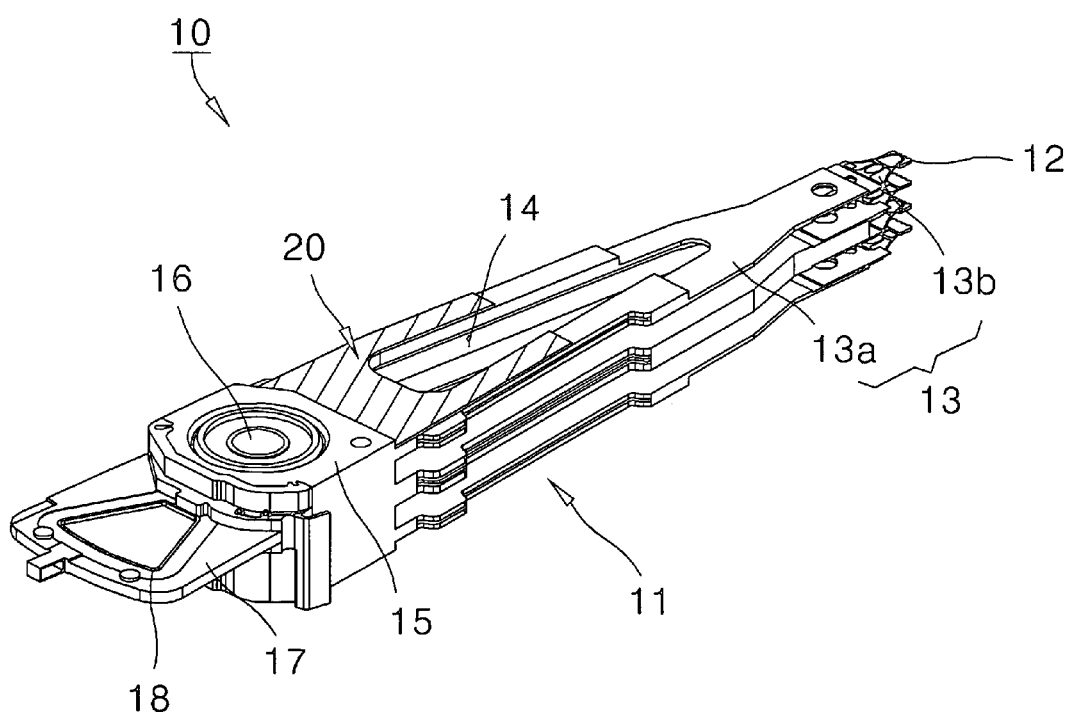
FIG. 3 illustrates a head stack assembly of a hard disk drive, such as that shown in FIG. 2, according to an embodiment of the present invention.

FIG. 3 illustrates a head stack assembly of a hard disk drive, such as that shown in FIG. 2, according to an embodiment of the present invention. Referring to FIGS. 2 and 3, the head stack assembly 10 may be a carriage to permit the recording and/or reproducing of data on the disk 71 and may include a head stack assembly main body 11, pivoting around the pivot shaft 16, to move across the disk 71, and a center of gravity compensation portion 20 coupled to the head stack assembly main body 11 to compensate for the imbalance of the center of gravity to be not more than a reference imbalance value, based on a measured imbalance value of the center of gravity of the head stack assembly main body 11 with respect to the rotational center of the pivot shaft 16. In this embodiment, the center of gravity compensation portion 20 may be a compensation weight, such as a compensation weight plate.

The head stack assembly main body 11 may include an actuator arm 13 having a triangular penetration opening 14 formed in the center area thereof, to substantially have a triangular shape, and movable to move the magnetic head 12 across the disk 71 to access the data on the disk 71, a pivot shaft holder 15 rotatably supporting the pivot shaft 16, to which the actuator arm 13 is coupled and supported thereby, and a bobbin 17 extending from the pivot shaft holder 15 in an opposite direction as the actuator arm 13 and having a voice coil motor (VCM) coil 18 wound therearound to be located between magnets of a voice coil motor. The actuator arm 13 may include a swing arm 13a, pivoting around the pivot shaft 16 by the operation of the voice coil motor, and a suspension 13b, supported by the swing arm 13a, having a magnetic head 12 attached to an end portion thereof. The reference imbalance value can be variously selected according to the capacity of the hard disk drive 1, and in particular, appropriately selected from a range between 1-30 mg·cm. In an embodiment of the present invention, the imbalance value should be lower than the reference imbalance value of 30 mg·cm. However, as the capacity of the hard disk drive increases, a more strict limit on the imbalance value may be needed.

According to an embodiment of the present invention, the center of gravity of the head stack assembly main body 11 may be measured before the head stack assembly 10 is completely manufactured and assembled in the hard disk drive 1. Here, the center of gravity compensation portion may be applied to make the imbalance value to not be more than 30 mg·cm. When the corrected imbalance value is maintained, the head stack assembly 10 may be assembled in the hard disk drive 1, such as that of FIG. 2. According to an embodiment of the present invention the center of gravity compensation portion may be a compensation weight coupled to the head stack assembly main body 11, e.g., compensation weight plate 20.

When the center of gravity of the head stack assembly main body 11 is measured, the center of gravity of the head stack assembly main body 11 may fall along the side of the actuator arm 13 or along the side of bobbin 17, with respect to the pivot shaft 16. When the center of gravity of the head stack assembly main body 11 falls along the side of the actuator arm 13, the compensation weight can be coupled to the side of the bobbin 17. However, since coupling the compensation weight to the bobbin 17 may be more difficult than coupling the same to the actuator arm 13, to facilitate the coupling, the side of the actuator arm 13 may be manufactured intentionally lighter, with respect to the pivot shaft 16. Thus, the side of the actuator arm 13 may actually be manufactured to be lighter so that the center of gravity of the head stack assembly main body 11 is made to fall along the side of the bobbin 17.

In the embodiment of the present invention, the compensation weight plate 20 may be coupled to the side of the actuator arm 13. In this embodiment, the center of gravity of the head stack assembly main body 11 is measured to fall along the side of the bobbin 17, with respect to a plane passing through the pivot shaft 16 and perpendicular to the lengthwise direction of the actuator arm 13. In detail, the imbalance of the head stack assembly main body 11 is located along a position at the side of the bobbin 17 and the desired value of the imbalance is measured to be not less than 30 mg·cm. Here, the compensation weight plate 20, for compensating for the imbalance in the center of gravity of the actuator arm 13, may be coupled to the head stack assembly main body 11 so that the imbalance value is not more than 30 mg·cm.

Figure 4:
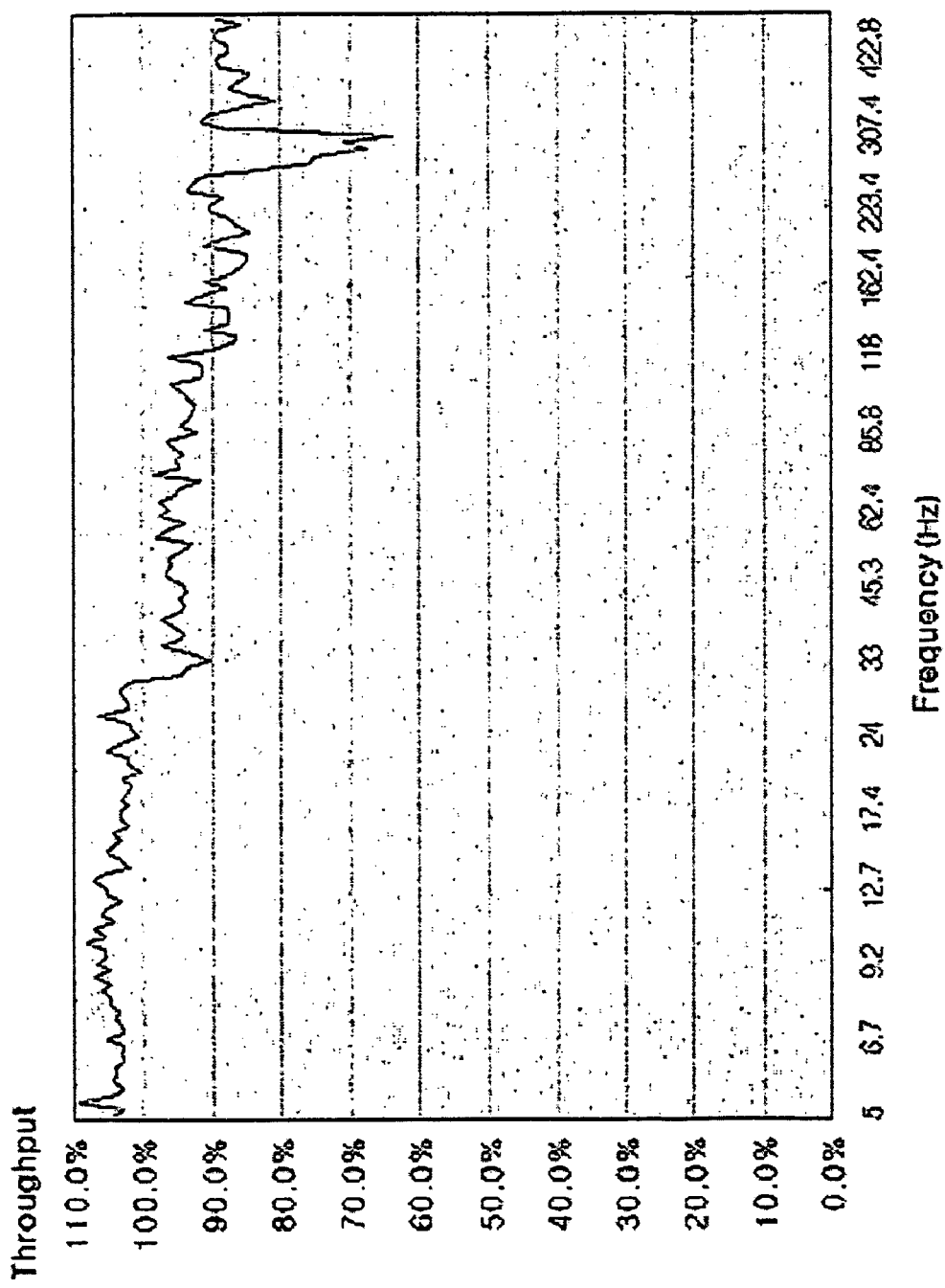
FIG. 4 graphically illustrates a measurement result of throughput with respect to the head stack assembly measured to have an imbalance value of over 100 mg·cm.
Figure 5:
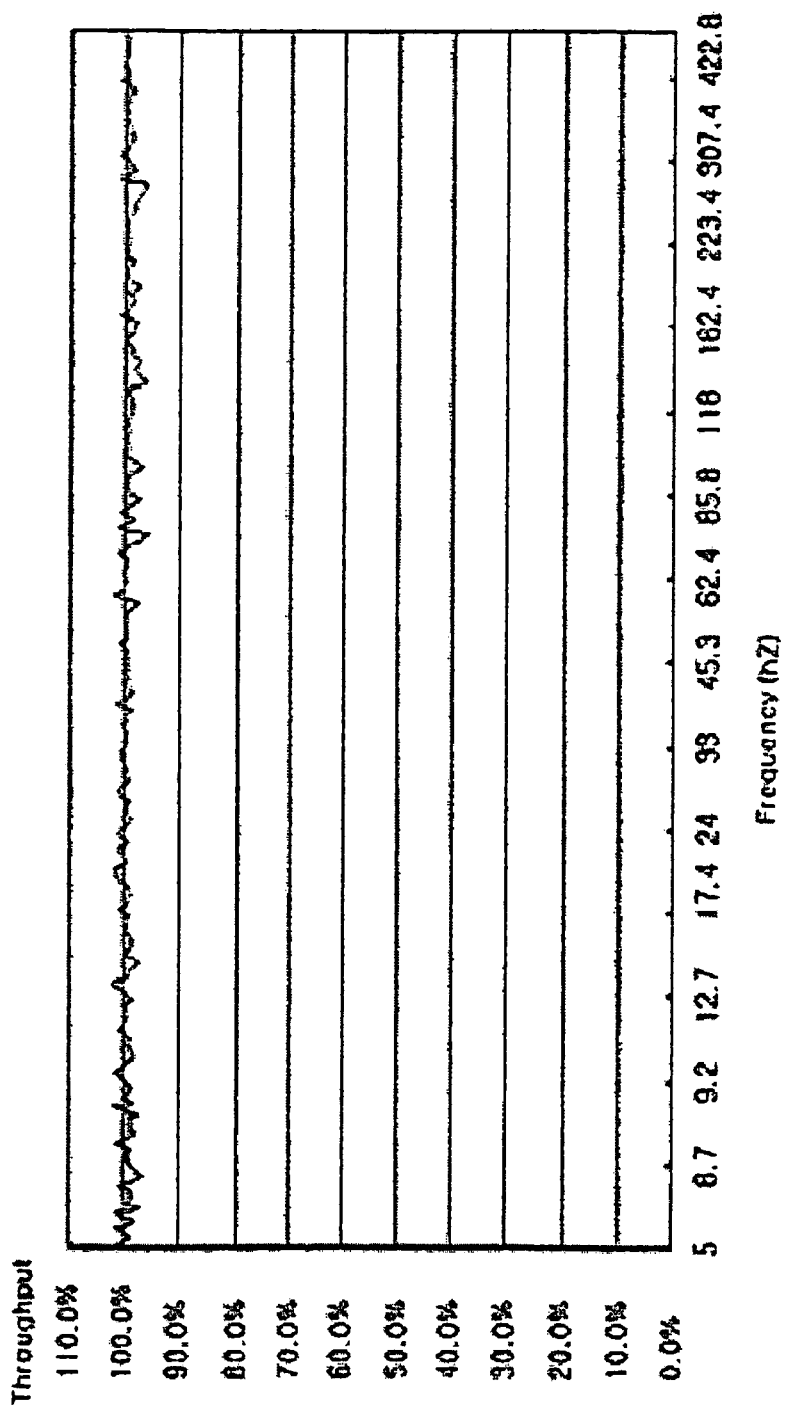
FIG. 5 graphically illustrates a measurement result of throughput after an imbalance value is compensated to be under 30 mg·cm by coupling a weight compensation plate to the actuator arm of a head stack assembly, such as the head stack assembly of FIG. 4, according to an embodiment of the present invention.

The compensation weight plate 20 may have a "U" shape and contact the surface of the actuator arm 13 adjacent to the triangular penetration opening 14 of the actuator arm 13. Although lengths of both legs of the compensation weight plate 20 may be the same, in one embodiment, the lengths of both legs may be different so that an imbalance in the left and right sides can be further compensated for. Accordingly, the improved effect of the head stack assembly 10, according to embodiments of the present invention, can be easily understood by comparing the graph illustrated in FIG. 4, showing throughput before implementation of an embodiment of the present invention, with the graph illustrated in FIG. 5 showing throughput after implementation of an embodiment of the present invention.

A hard disk drive method, according to an embodiment of the present invention, will now be described in more detail below.

The head stack assembly main body 11, which may read out data from the disk 71 while moving across the disk 71, may be manufactured according to a predetermined design. An imbalance value of the center of gravity of the head stack assembly main body 11, with respect to the rotational center of the pivot shaft 16, may be measured using a balance measurer (not shown). The balance measurer may indicate deviation of an imbalance value for the center of gravity of the head stack assembly main body 1 from the rotational center of the pivot shaft 16, along with a corresponding imbalance position thereof. Accordingly, an amount and position of the imbalance value may be recognized so that it can be seen where to apply a compensation weight plate 20 to compensate for the imbalance in the center of gravity.

Too compensate for the imbalance in the center of gravity, the compensation weight plate 20 may be supported on the actuator arm 13 to contact the same so that the imbalance value is not more than 30 mg·cm, based on the above measured imbalance value. Thus, according to an embodiment of the present invention, head stack assembly 10 whose imbalance in the center of gravity of the head stack assembly 10 has been compensated for, may be provided.

Thus, once the imbalance value is not more than 30 mg·cm, the head stack assembly 10 may be assembled in the hard disk drive 1. The head stack assembly 10, whose imbalance in the center of gravity has been compensated for, will maintain a particular throughput, such as that which satisfies the requisites shown in FIG. 5, compared to illustration of FIG. 4 prior to the compensation.

Figure 6:
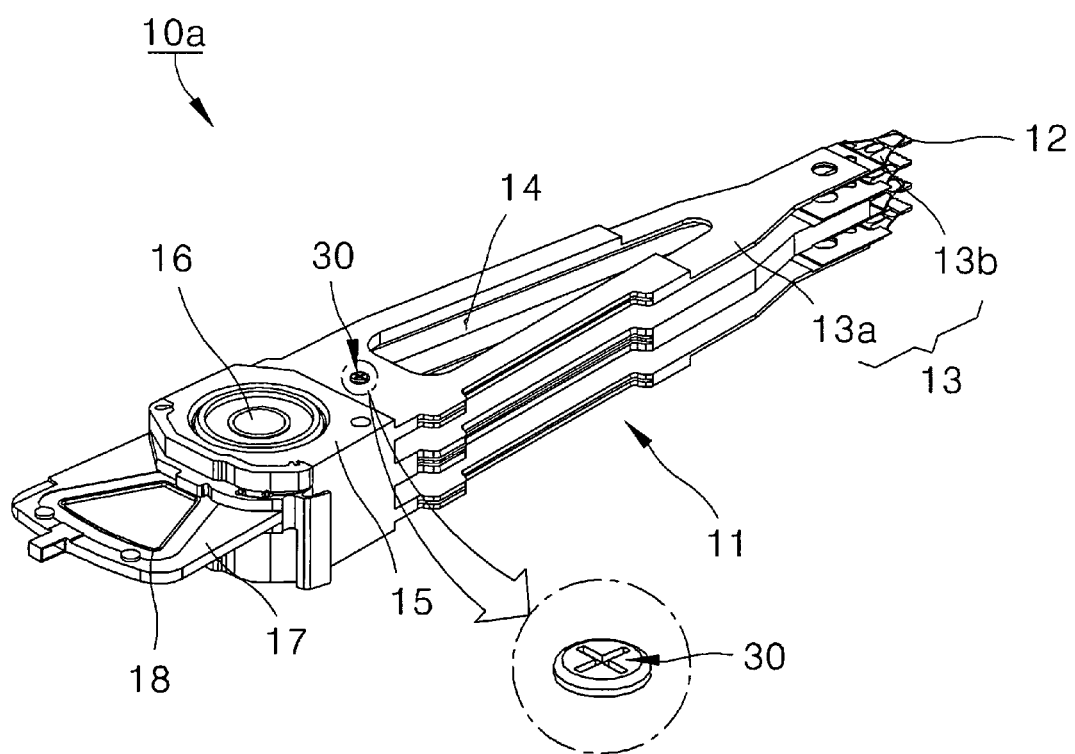
FIG. 6 illustrates a head stack assembly of a hard disk drive, according to another embodiment of the present invention.
Figure 7:
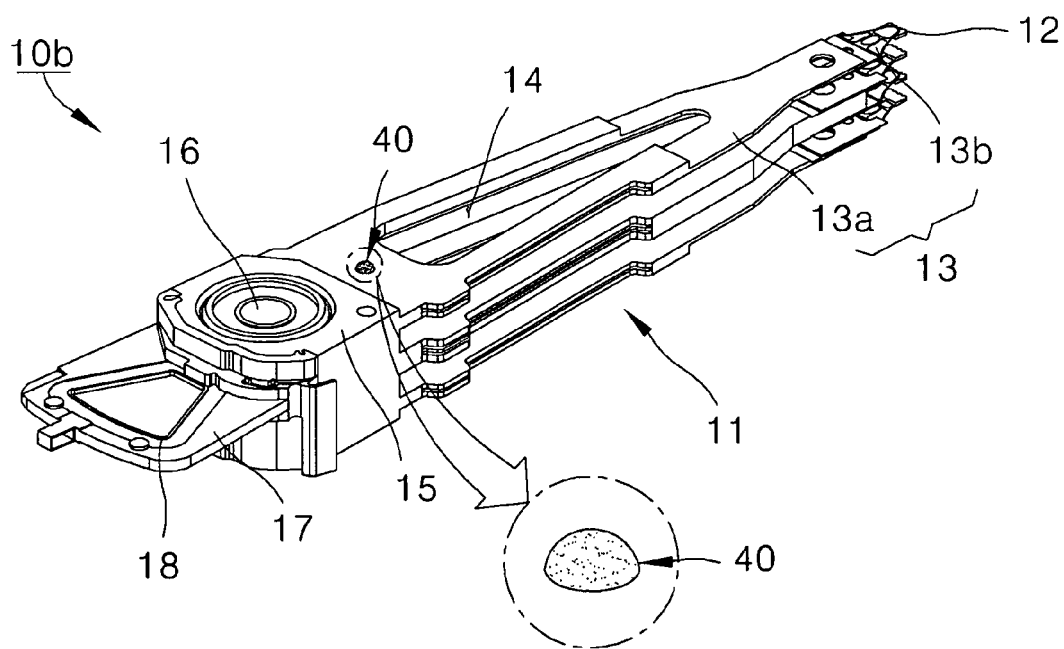
FIG. 7 illustrates a head stack assembly of a hard disk drive, according to yet another embodiment of the present invention.
Figure 8:
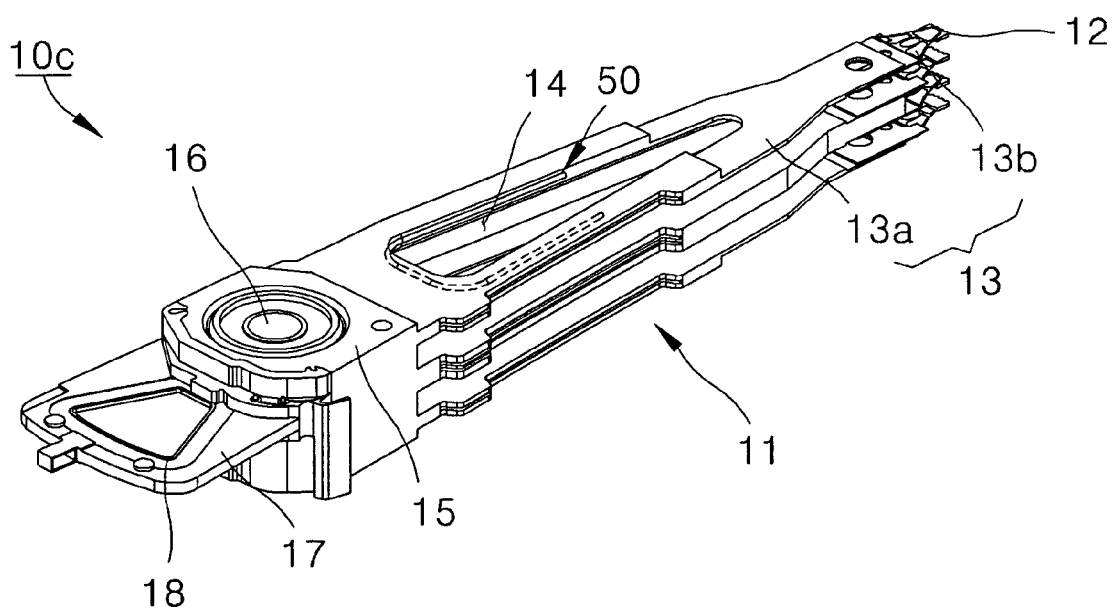
FIG. 8 illustrates a head stack assembly of a hard disk drive, according to still yet another embodiment of the present invention.

In an embodiment of the present invention, the compensation weight may be replaced by other compensation weights, different from the above described compensation weight plate 20. FIGS. 6-8 illustrate head stack assemblies of a hard disk drive according to alternative embodiments of the present invention.

In an embodiment shown in FIG. 6, a screw 30 may be detachably coupled to an area on the surface of the actuator arm 13 of head stack assembly 10a. However, a balance snap may also be used in some cases. In these cases, a screw hole to couple the screw 30 or a hole for inserting the balance snap may generally be provided in the actuator arm 13 in advance.

In an embodiment shown in FIG. 7, a fluid material, e.g., a bonding material 40, may be applied to an area on the surface of the actuator arm 13 of head stack assembly 10b as the compensation weight. The fluid material may be a liquid that subsequently hardens. As an alternative, a glue or epoxy may be used. Compared to the embodiment of FIG. 6, a screw hole is not needed in this embodiment, rather, a glue or bonding material, for example, may be easily and conveniently pasted on an appropriate position.

In an embodiment shown in FIG. 8, the compensation weight may be a balance ring 50 that is partially inserted along an inner surface of the triangular penetration opening 14 of the actuator arm 13 of head stack assembly 10c. The balance ring 50, for example, may be manufactured of synthetic resin having elasticity and may also have a "U" shape. Here, the balance ring 50 may further compensate for an imbalance in the left or right sides by controlling the length of both legs of the "U" shaped balance ring 50.

Although, in the above-described embodiments, embodiments have been set forth as being implemented with at least compensation weight plate 20, a screw 30, a balance snap, a glue, a bonding material 40, and a balance ring 50, as a center of gravity compensation portion for compensating for the imbalance in the center of gravity of the head stack assembly 10, the center of gravity compensation portion may further include a plurality of separable dummy weights. When the center of gravity of the head stack assembly main body 11 falls along the side of the actuator arm 13, measured after the dummy weights are detachably coupled to the actuator arm 13, the imbalance in the center of gravity of the head stack assembly main body 11 may be further compensated for by separating each of the dummy weights coupled to the actuator arm 13.

As described above, according to embodiments of the present invention, when the imbalance value of the center of gravity of the head stack assembly, with respect to the rotational center of the pivot shaft, and measured with respect to the head stack assembly, is manufactured according to a predetermined design that does not satisfy predetermined imbalance requisites, the imbalance in the center of gravity of the head stack assembly can be compensated for by making the imbalance value not more than a particular reference, thereby satisfying the predetermined requisites. Thus, effects of vibration on a position error signal can be reduced, compared to conventional systems, thereby stably maintaining throughput efficiency of the hard disk.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A head stack assembly, comprising:
   a head stack assembly main body for moving across a disk, around a predetermined pivot shaft, for recording and/or reproducing of data to/from the disk; and
   a center of gravity compensation portion coupled to the head stack assembly main body and compensating for an imbalance in a center of gravity of the head stack assembly main body with respect to a rotational center corresponding to the pivot shaft, the imbalance not being more than a reference imbalance value,
   wherein the center of gravity compensation portion is a compensation weight coupled to the head stack assembly main body,
   wherein the compensation weight is a fluid material when initially contacting an area of a surface of the head stack assembly main body.

2. The head stack assembly of claim 1, wherein the fluid material is one of glue and bonding material.

3. A head stack assembly, comprising:
   a head stack assembly main body for moving across a disk, around a predetermined pivot shaft, for recording and/or reproducing of data to/from the disk; and
   a center of gravity compensation portion coupled to the head stack assembly main body and compensating for an imbalance in a center of gravity of the head stack assembly main body with respect to a rotational center corresponding to the pivot shaft, the imbalance not being more than a reference imbalance value,
   wherein the center of gravity compensation portion is a compensation weight coupled to the head stack assembly main body,
   wherein the compensation weight is a balance ring that is partially inserted along an inner surface of a triangular penetration opening of the head stack assembly main body.

4. The head stack assembly of claim 3, wherein the balance ring substantially has a "U" shape with two legs, and the two legs having different lengths.

5. A hard disk drive, comprising:
   at least one rotatable disk for storing data; and
   a head stack assembly comprising a head stack assembly main body moving across the disk, around a predetermined pivot shaft, and a center of gravity compensation portion coupled to the head stack assembly main body and compensating for an imbalance in a center of gravity of the head stack assembly main body with respect to a rotational center corresponding to the pivot shaft the imbalance not being more than a reference imbalance value,
   wherein the center of gravity compensation portion is a compensation weight that is coupled to the head stack assembly main body,
   wherein the compensation weight is fluid material when initially contacting an area of a surface of the head stack assembly main body.

6. The hard disk drive of claim 5, wherein the fluid material is one of glue and bonding material.

7. A hard disk drive, comprising:
   at least one rotatable disk for storing data; and
   a head stack assembly comprising a head stack assembly main body moving across the disk, around a predetermined pivot shaft, and a center of gravity compensation portion coupled to the head stack assembly main body and compensating for an imbalance in a center of gravity of the head stack assembly main body with respect to a rotational center corresponding to the pivot shaft the imbalance not being more than a reference imbalance value,
   wherein the center of gravity compensation portion is a compensation weight that is coupled to the head stack assembly main body,
   wherein the compensation weight is a balance ring that is partially inserted along an inner surface of a triangular penetration opening of the head stack assembly main body.

8. The hard disk drive of claim 7, wherein the balance ring substantially has a "U" shape with two legs, the two legs having different lengths.

9. A hard disk drive method, comprising:
   measuring an imbalance value of a center of gravity of a head stack assembly main body with respect to a rotational center corresponding to a pivot shaft; and
   compensating for an imbalance in the measured center of gravity to not be more than a reference imbalance value by instilling a plate-shaped center of gravity compensation portion with the head stack assembly main body;
   and modifying the center of gravity compensation portion to compensate for another measured imbalance in a center of gravity, with respect to a pivot shaft rotational center, of the head stack assembly main body.

10. A hard disk drive method, comprising:
    measuring an imbalance value of a center of gravity of a head stack assembly main body with respect to a rotational center corresponding to a pivot shaft; and
    compensating for an imbalance in the measured center of gravity to not be more than a reference imbalance value by instilling a plate-shaped center of gravity compensation portion with the head stack assembly main body,
    wherein, in the compensating of the imbalance in the center of gravity, the reference imbalance value is between 1-30 mg·cm.

* * * * *